United States Patent
Kalish et al.

(10) Patent No.: US 6,959,137 B2
(45) Date of Patent: Oct. 25, 2005

(54) LARGE-EFFECTIVE-AREA INVERSE DISPERSION COMPENSATING FIBER, AND A TRANSMISSION LINE INCORPORATING THE SAME

(75) Inventors: David Kalish, Roswell, GA (US); Robert Lingle, Jr., Norcross, GA (US); David W. Peckham, Lawrenceville, GA (US); Yi Sun, Duluth, GA (US)

(73) Assignee: Fitel U.S.A. Corporation, Norcross, GA (US)

( * ) Notice: Subject to any disclaimer, the term of this patent is extended or adjusted under 35 U.S.C. 154(b) by 204 days.

(21) Appl. No.: 10/459,038

(22) Filed: Jun. 11, 2003

(65) Prior Publication Data

US 2004/0252956 A1 Dec. 16, 2004

(51) Int. Cl.[7] ................................................. G02B 6/02
(52) U.S. Cl. ........................ 385/127; 385/123; 385/128
(58) Field of Search ............................... 385/126–128, 385/123

(56) References Cited

U.S. PATENT DOCUMENTS

| | | | |
|---|---|---|---|
| 5,327,516 A | | 7/1994 | Chraplyvy et al. |
| 5,361,319 A | * | 11/1994 | Antos et al. ................. 385/123 |
| 5,999,679 A | * | 12/1999 | Antos et al. ................. 385/127 |
| 6,301,419 B1 | | 10/2001 | Tsukitani et al. |
| 6,317,551 B1 | * | 11/2001 | Mitchell et al. ............. 385/124 |
| 6,421,490 B1 | | 7/2002 | Liu |
| 6,707,976 B1 | * | 3/2004 | Gruner-Nielsen et al. .. 385/123 |
| 6,766,089 B2 | * | 7/2004 | Arai et al. ................... 385/123 |
| 6,829,422 B2 | * | 12/2004 | Berkey et al. ............... 385/126 |
| 2002/0041746 A1 | * | 4/2002 | Kato et al. ................... 385/123 |
| 2002/0191927 A1 | | 12/2002 | Liu |
| 2003/0095769 A1 | * | 5/2003 | Aikawa et al. .............. 385/127 |
| 2004/0190847 A1 | * | 9/2004 | Bickham et al. ............ 385/127 |

FOREIGN PATENT DOCUMENTS

| | | |
|---|---|---|
| EP | 1 107 028 A1 | 6/2001 |
| EP | 1 239 312 A1 | 9/2002 |
| EP | 1 308 756 A1 | 5/2003 |
| EP | 1 318 419 A1 | 6/2003 |
| EP | 1 396 743 A2 | 3/2004 |

* cited by examiner

*Primary Examiner*—Ellen E. Kim
(74) *Attorney, Agent, or Firm*—Gardner Groff, P.C.

(57) ABSTRACT

An inverse dispersion fiber having a large effective area and a transmission system that incorporates the fiber for providing dispersion and dispersion slope compensation in a transmission fiber. The large-effective-area inverse dispersion optical fiber (IDF) has a negative dispersion and a negative dispersion slope. The effective area, $A_{eff}$, of the IDF preferably is greater than approximately 31 micrometers squared ($\mu m^2$) at a transmission wavelength of approximately 1550 nm. The large-effective-area IDF is suitable for use with super-large-effective-area (SLA) transmission fiber for compensating dispersion in the SLA transmission fiber while reducing nonlinear effects between wavelength channels and cabling loss, which is especially advantageous in transoceanic and long-haul terrestrial systems. These nonlinear effects are inversely related to the effective area of the fiber (i.e., nonlinearities~$1/A_{eff}$). Thus, an increase in the effective area of the fiber translates into a decrease in nonlinear interactions, which increases bandwidth capabilities and limits signal degradation. Furthermore, the large-effective-area IDF of the present invention has very desirable transmission properties. The present invention also provides a transmission system comprising at least one of the large-effective-area IDF optical fibers of the present invention. Furthermore, $A_{eff}$ can be made large without having to increase the ratio, $R_a$, of the diameter of the core to the diameter of the trench region.

34 Claims, 7 Drawing Sheets

LARGE-EFFECTIVE-AREA INVERSE DISPERSION COMPENSATING FIBER, AND A TRANSMISSION LINE INCORPORATING THE SAME

BACKGROUND OF THE INVENTION

1. Field of the Invention

The invention relates to an inverse dispersion compensating optical fiber. More particularly, the invention relates to a large-effective-area inverse dispersion compensating optical fiber that exhibits relatively low optical loss relative to conventional inverse dispersion fiber and that is suitable for compensating dispersion in large-effective-area positive dispersion fiber.

2. Description of the Related Art

Optical fibers are thin strands of glass or plastic capable of transmitting optical signals, containing relatively large amounts of information, over long distances and with relatively low attenuation. Typically, optical fibers are made by heating and drawing a portion of an optical preform comprising a refractive core region surrounded by a protective cladding region made of glass or other suitable material. Optical fibers drawn from the preform typically are protected further by one or more coatings applied to the cladding region.

Advances in transmission over optical fibers have enabled optical fibers to have enormous bandwidth capabilities. Such bandwidth enables thousands of telephone conversations and hundreds of television channels to be transmitted simultaneously over a hair-thin fiber. Transmission capacity over an optical fiber is increased in wavelength division multiplexing (WDM) systems wherein several channels are multiplexed onto a single fiber, with each channel operating at a different wavelength. However, in WDM systems, nonlinear interactions between channels occur, such as 4-photon mixing, which severely reduces system capacity. This problem has largely been solved by U.S. Pat. No. 5,327,516 (the '516 patent), which is owned by the assignee of the present application. The '516 patent discloses an optical fiber that reduces these nonlinear interactions by introducing a small amount of chromatic dispersion at the operating wavelengths. As the number of WDM channels to be transmitted over a single fiber increases, the optical power carried by the optical fiber also increases. As the optical power increases, the nonlinear effects caused by interaction between the channels also increases. Therefore, it is desirable for an optical fiber to provide a small amount of chromatic dispersion to each of the WDM channels in order to reduce the nonlinear interactions between the channels, especially in view of ever-increasing bandwidth demands. However, in order to be able to restore the signal after the transmission link, it is important that the dispersion introduced vary as little as possible amongst the different WDM channels.

Important advances have been made in the quality of the material used in making optical fibers. In 1970, an acceptable loss for glass fiber was in the range of 20 dB/km, whereas today losses are generally less than about 0.25 dB/km. The theoretical minimum loss for silica based fiber is about 0.15 dB/km, and it occurs at a wavelength of about 1550 nanometers (nm). Dispersion in a glass fiber causes pulse spreading for pulses that include a range of wavelengths, due to the fact that the speed of light in a glass fiber is a function of the transmission wavelength of the light. Pulse broadening is a function of the fiber dispersion, the fiber length and the spectral width of the light source.

Dispersion for individual fibers is generally illustrated using a graph (not shown) having dispersion on the vertical axis (in units of picoseconds (ps) per nanometer (nm), or ps/nm) or ps/nm-km (kilometer) and wavelength on the horizontal axis. There can be both positive and negative dispersion, so the vertical axis may range from, for example, −250 to +25 ps/nm km. The wavelength on the horizontal axis at which the dispersion equals zero corresponds to the highest bandwidth for the fiber. However, this wavelength typically does not coincide with the wavelength at which the fiber transmits light with minimum attenuation.

For example, typical single mode fibers generally transmit best (i.e., with minimum attenuation) at about 1550 nm, whereas dispersion for the same fiber would be approximately zero at 1310 nm. Also, the aforementioned theoretical minimum loss for glass fiber occurs at the transmission wavelength of about 1550 nm. Because minimum attenuation is prioritized over zero dispersion, the wavelength normally used to transmit over such fibers is typically 1550 nm. Also, Erbium-doped amplifiers, which currently are the most commonly used optical amplifiers for amplifying optical signals carried on a fiber, operate in 1530 to 1565 nm range. Because dispersion for such a fiber normally will be closest to zero at a wavelength of 1310 nm rather than at the optimum transmission wavelength of 1550 nm, attempts are constantly being made to improve dispersion compensation over the transmission path in order to provide best overall system performance (i.e., low optical loss and low dispersion).

In order to improve dispersion compensation at the transmission wavelength of 1550 nm, it is known to couple the transmission fiber, which normally is a positive dispersion fiber (PDF), with an inverse dispersion fiber (IDF). The positive dispersion transmission fiber typically comprises a single mode fiber designed to introduce dispersion in order to reduce the nonlinear interactions between wavelength channels. The inverse dispersion fiber has a negative dispersion and negative dispersion slope that provide dispersion and dispersion slope compensation that enable the dispersion and dispersion slope compensation of the transmission fiber to be managed. The transmission PDF is coupled to a length of IDF by splicing. The combination of the PDF and the IDF has both an intrinsic fiber loss and a splicing loss. Of course, overall optical loss for a transmission link should be kept at a minimum. The need to minimize optical loss is even more important when long transmission links are involved due to the fact that more amplifiers normally are needed along the link to prevent transmission quality degeneration.

For example, in trans-oceanic communications systems it is advantageous to use a combination of super-large-effective-area (SLA) PDF and an IDF having matching relative dispersion slopes (RDSs) at a particular wavelength, usually at the center of the transmission band. The RDS of a fiber is the ratio of the dispersion slope, S, of the fiber to the dispersion, D, of the fiber. The RDS of the IDF needs to match the RDS of the PDF for proper management of dispersion and dispersion slope. However, merely matching the RDSs of the transmission PDF and the compensating IDF does not solve all problems. Other issues such as management of the aforementioned nonlinear effects, bending loss and optical attenuation should also be taken into consideration. Conventional IDF used for compensating dispersion in a SLA transmission fiber has a median loss of, for example, approximately 0.246 db/km at 1550 nm. One way to decrease the overall loss of the transmission link would be to provide an IDF that has a lower fiber loss than conventional IDF that is currently used in combination with SLA transmission fibers. However, conventional IDFs currently used with these SLA PDFs have relatively small effective areas, which presents problems. For example, the small effective area of the IDF limits the amount by which the overall nonlinear effects between channels and attenuation loss can be reduced, which limits the degree by which degradations in system transmission performance can be prevented. Of course, when system transmission performance degrades, the number of WDM channels that these systems can support becomes limited.

U.S. Pat. No. 6,301,419 B1 to Tsukitani, et al. discloses a dispersion-equalizing fiber that is designed to have reduced bending loss so that it is suitable for use in a dispersion compensating module in which it will be wound about a spool and spliced with a transmission fiber to reduce dispersion and the dispersion slope of the transmission line as a whole. Tsukitani discloses that the dispersion-equalizing fiber has an effective area of anywhere from 15 to 19 micrometers squared ($\mu m^2$), and discloses that the dispersion-equalizing fiber having these effective areas restrains the aforementioned nonlinear effects. As a consequence, the dispersion-equalizing fiber has a bending loss of 10 to 50 dB/m with respect to light having a wavelength of 1550 nm when wound at a diameter of 20 mm.

Tsukitani discloses that it is desirable to maintain the ratio of the length of the dispersion-equalizing fiber to the length of the total transmission line (i.e., length of the dispersion-equalizing fiber+length of the transmission fiber), which is referred to in Tukitani as the DEF ratio, between 25% and 40% in order to repress nonlinear effects. As shown in FIG. 2B in Tsukitani, when the DEF ratio is between 25% and 40%, the effective area, $A_{eff}$, of the dispersion-equalizing fiber ranges from between about 15 and about 19 $\mu m^2$. Tsukitani discloses that the nonlinearity index can be kept within acceptable ranges that provide low bending loss when the effective area of the dispersion-equalizing fiber is anywhere from about 15 $\mu m^2$ to about 19 $\mu m^2$ and when the ratio, $R_a$, between the diameter of the core region and the diameter of the trench region is greater than around 0.6. Thus, not only is the DEF ratio a factor taken into account in designing a dispersion-equalizing fiber with low bending loss, the ratio $R_a$ is also taken into account. The diameter of the core region generally doesn't change very much compared to the amount by which the diameter of the trench region may vary. It can be seen from FIGS. 3–9 in Tsukitani that when the effective area $A_{eff}$ is anywhere from about 15 $\mu m^2$ to about 19 $\mu m^2$ and $R_a$ is greater than 0.6, the dispersion-equalization fiber exhibits a relatively low 20 mm bending loss and has a good nonlinear index.

One of the disadvantages of the dispersion-equalization fiber disclosed in Tsukitani is that, as can be seen from the figures in Tsukitani, increases in the effective area $A_{eff}$ and/or $R_A$ reduce the ability of the fiber to repress nonlinear effects and/or increase bending loss. It would be desirable to provide an inverse dispersion fiber (IDF) that has a large effective area $A_{eff}$ and that is capable of maintaining the aforementioned desirable transmission characteristics, such as, for example, low attenuation loss, reduced nonlinear interactions between channels, etc, even with an $R_a$ less than or equal to, for example, 0.45. It would also be desirable to provide a large-effective-area IDF that has a low cable cutoff wavelength (e.g., below 1500 nm) and bending loss sensitivities that will result in a reduction in cabling optical loss.

SUMMARY OF THE INVENTION

The present invention provides a large-effective-area inverse dispersion optical fiber (IDF) that has a negative dispersion and a negative dispersion slope. The term "inverse dispersion fiber", as that term is used herein, is intended to denote a dispersion compensating fiber that has a negative dispersion and a negative dispersion slope. The effective area, $A_{eff}$, of the IDF, is defined as $$A_{eff} = 2\pi \frac{\int_0^\infty |E(r)^2 rdr|^2}{\int_0^\infty |E(r)^4 rdr|}$$

where E(r) is the electric field distribution The effective area, $A_{eff}$, of the large-effective-area IDF of the present invention is greater than approximately 31 micrometers squared ($\mu m^2$) at a transmission wavelength of approximately 1550 nm. The large-effective-area IDF is suitable for use with super-large-effective-area (SLA) transmission fiber for compensating dispersion in the SLA transmission fiber while reducing nonlinear effects between wavelength channels and cabling loss, which is especially advantageous in transoceanic and long-haul terrestrial systems. These nonlinear effects are inversely related to the effective area of the fiber (i.e., nonlinearities $\sim 1/A_{eff}$). Thus, an increase in the effective area of the fiber translates into a decrease in nonlinear interactions, which increases bandwidth capabilities and limits signal degradation. Furthermore, the large-effective-area IDF of the present invention has very desirable transmission properties. In addition, the ratio of the core region of the IDF to the trench region of the IDF preferably is less than or equal to 0.45. The present invention also provides a transmission system comprising at least one of the large-effective-area IDF optical fibers of the present invention.

The large-effective-area IDF of the present invention can have a variety of profiles. For example, in accordance with a first example embodiment, the profile of the core region of the fiber is generally defined by an alpha parameter in shape, $$n_1 = n_0\left(1 - \left(\frac{r}{a}\right)^\alpha\right) - n_\gamma\left(\frac{r}{d}\right)^\gamma$$

where $n_1$ is the relative refractive index difference for core, r is the radial position, a is the radius of core, $\alpha$ is the shape parameter, d is the central dip width, $\gamma$ is the dip shape parameter, and $n_0$ and $n_\gamma$ are parameters to define the relative refractive index difference for core and central dip, respectively. The core region has a positive index of refraction and is surrounded by a first annular region (i.e., a first trench region) that has a negative relative index of refraction (i.e., a first trench region). The first annular region is surrounded by a second annular region (i.e., a first barrier region) that has a positive relative index of refraction. The second annular region is surrounded by a third annular region (i.e., a second trench region) that has a negative relative index of refraction. The third annular region may be surrounded by a fourth annular region that has a relative index of refraction of 0.

The phrase "relative index of refraction", as that phrase is used herein, means that the values of the refractive indices of the regions of the fiber other than the cladding region are given as values that are relative to the refractive index of the cladding region. The cladding region is said to have a relative refractive index of 0.0%. The fourth annular region is surrounded by a fifth annular region (i.e., a third trench region) that has a negative index of refraction. The fifth annular region is surrounded by the cladding region, which, as stated above, has a refractive index of 0 because the refractive index values of the other regions are normalized to the refractive index of the cladding region.

In accordance with a second example embodiment, the profile of the core region of the fiber is non-parabolic (i.e., not curved) in shape. The core region has a positive index of refraction and is surrounded by a first annular region (i.e., a first trench region) that has a negative relative index of refraction. The first annular region is surrounded by a second annular region (i.e., a first barrier region) that has a positive relative index of refraction. The second annular region is surrounded by a third annular region (i.e., a second trench region) that has a negative relative index of refraction. The third annular region is surrounded by a fourth annular region that has a relative index of refraction of 0. The fourth annular region may be surrounded by a fifth annular region (i.e., a third trench region) that has a negative index of refraction. The fifth annular region is surrounded by the cladding region, which, as stated above, has a refractive index of 0 because the refractive index values of the other regions are normalized to the refractive index of the cladding region.

In accordance with a third example embodiment, the profile of the core region of the fiber is somewhat curved in shape at the peak of the profile, but then descends generally linearly on each side of the peak. The core region has a positive index of refraction and is surrounded by a first annular region (i.e., a first trench region) that has a negative relative index of refraction. The first annular region is surrounded by a second annular region (i.e., a first barrier region) that has a positive relative index of refraction. The second annular region is surrounded by a third annular region that has a relative index of refraction equal to that of the cladding region (i.e., 0%). The third annular region is surrounded by a fourth annular region (i.e., a second trench region) that has a negative relative index of refraction. The fourth annular region is surrounded by the cladding region, which, as stated above, has a refractive index of 0.

The refractive index value for a given region is given by the equation $(n_{region} - n_{cladding})/n_{cladding}$, where $n_{region}$ corresponds to the refractive index of the particular region and $n_{cladding}$ corresponds to the refractive index of the cladding. Therefore, when the indices of refraction of the various regions of the fiber are discussed herein, it should be understood that they are actually being discussed in terms of relative indices of refraction (i.e., relative to the index of refraction of the cladding region, which is 0).

The cladding region has a radius measured outwards from the center of the core of approximately 62.5 $\mu$m, although it is not limited to any particular dimensions. As can be seen from the examples given above, each of the profiles has at least one annular region that have negative relative indices of refraction. In accordance with the present invention, it has been determined that these example profiles and other similar profiles result in an IDF that has a large effective area and, in addition, that has desirable transmission properties.

These and other features and advantages of the present invention will become apparent from the following description, drawings and claims.

DETAILED DESCRIPTION OF THE PREFERRED EMBODIMENT

In accordance with the present invention, an IDF having a large effective area is provided. Furthermore, the IDF having the large effective area has desirable transmission characteristics. In particular, the large-effective-area IDF preferably has a cable cutoff wavelength below 1500 nm and bending loss sensitivities that allow low cabling loss to be achieved. In addition, to providing these desirable features, the IDF simultaneously compensates dispersion to a sufficiently precise degree to enable desired ((distance)×(bit-rate)) transmission capabilities to be achieved.

The large-effective-area IDF of the present invention is suitable for compensating dispersion in many types of optical fibers such as, for example, positive dispersion, pure silica core fiber from Sumitomo Electric Industries, Ltd., as described in "Ultra Low Nonlinearity Low Loss Pure Silica Core Fiber," Electronics Letters Online No: 19991094, 3 Aug. 1999; Vascade 100 fiber from Corning; large effective area fiber from Fujitsu; and UltraWave™ SLA fiber from OFS Fitel Corporation. The large-effective-area IDF of the present invention is well suited for use in transoceanic and ultra long-haul terrestrial transmission systems, although it is not limited to use in any particular transmission system. As stated above, in such systems, the small effective areas of IDF currently used limits the degree to which nonlinear interactions between wavelength channels can be reduced and the degree to which attenuation loss can be reduced. These limitations translate into degradations in transmission system performance and a decrease in the number of wavelength division multiplexed (WDM) channels that can be supported. The large-effective-area IDF of the present invention eliminates all of these problems and maintains desirable transmission properties.

Figure 1:
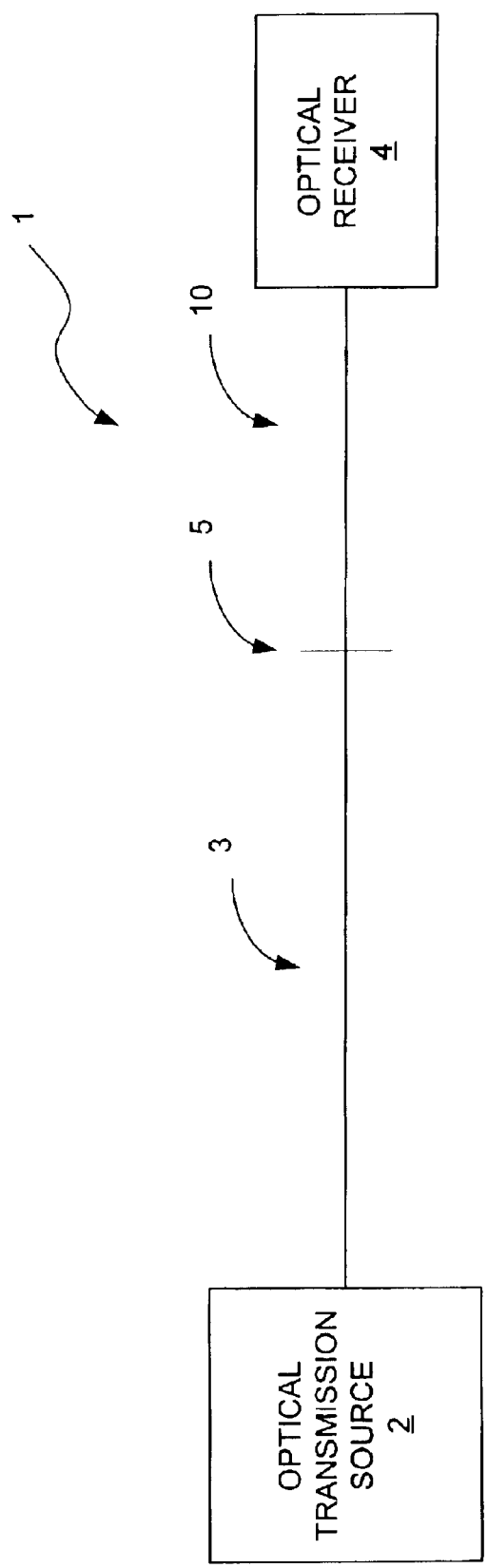
FIG. 1 is a block diagram of a transmission system in which the large-effective-area inverse dispersion optical fiber of the present invention is utilized.

FIG. 1 is a block diagram of the transmission system 1 of the present invention comprising an optical transmission source 2, at least one transmission fiber 3, the large-effective-area IDF 10 of the present invention and an optical receiver 4. The transmission fiber 3 is spliced to the large-effective-area fiber 10 at location 5. The manner in which a dispersion compensating fiber may be spliced with another fiber is well known in the art. Therefore, a discussion of the manner in which this task is performed will not be provided herein. The transmission fiber may be an SLA fiber, such as, for example, SLA UltraWave™ fiber manufactured by the OFS Fitel Corporation. However, it should be noted that the present invention is not limited to any particular type of fiber for use as the transmission fiber 3.

As stated above, in order to properly compensate for dispersion, the dispersion and dispersion slope compensating fiber should have a relative dispersion slope (RDS) that matches the RDS of the transmission fiber 3. For example, SLA UltraWave™ fiber has an RDS of 0.0030 at 1550 nm. Therefore, SLA UltraWave™ fiber is used as the transmission fiber 3, the large-effective area IDF 10 of the present invention should have an RDS close to 0.0030. Note, because the curvature in the dispersion curve of the IDF and the PDF are not identical, it is sometimes desirable to slightly mismatch the RDS of the two fibers at the center of the band in order to increase the usable bandwidth. The transmission fiber 3 has a positive dispersion and positive dispersion slope whereas the large-effective area IDF 10 has a negative dispersion and negative dispersion slope. Thus, both RDS values are positive because, as stated above, the RDS of a fiber is the ratio of the dispersion slope, S, of the fiber to the dispersion, D, of the fiber. The effective area, $A_{eff}$, of the IDF preferably is greater than approximately 31 micrometers squared ($\mu m^2$), which is very large for an IDF, as will be recognized by those skilled in the art. The example profiles described below with reference to FIGS. 2, 3 and 4 have effective areas that are greater than approximately 31 $\mu m^2$ and very desirable transmission properties. These examples of refractive index profiles of the IDFs of the present invention will now be described along with their associated transmission properties.

Figure 2:
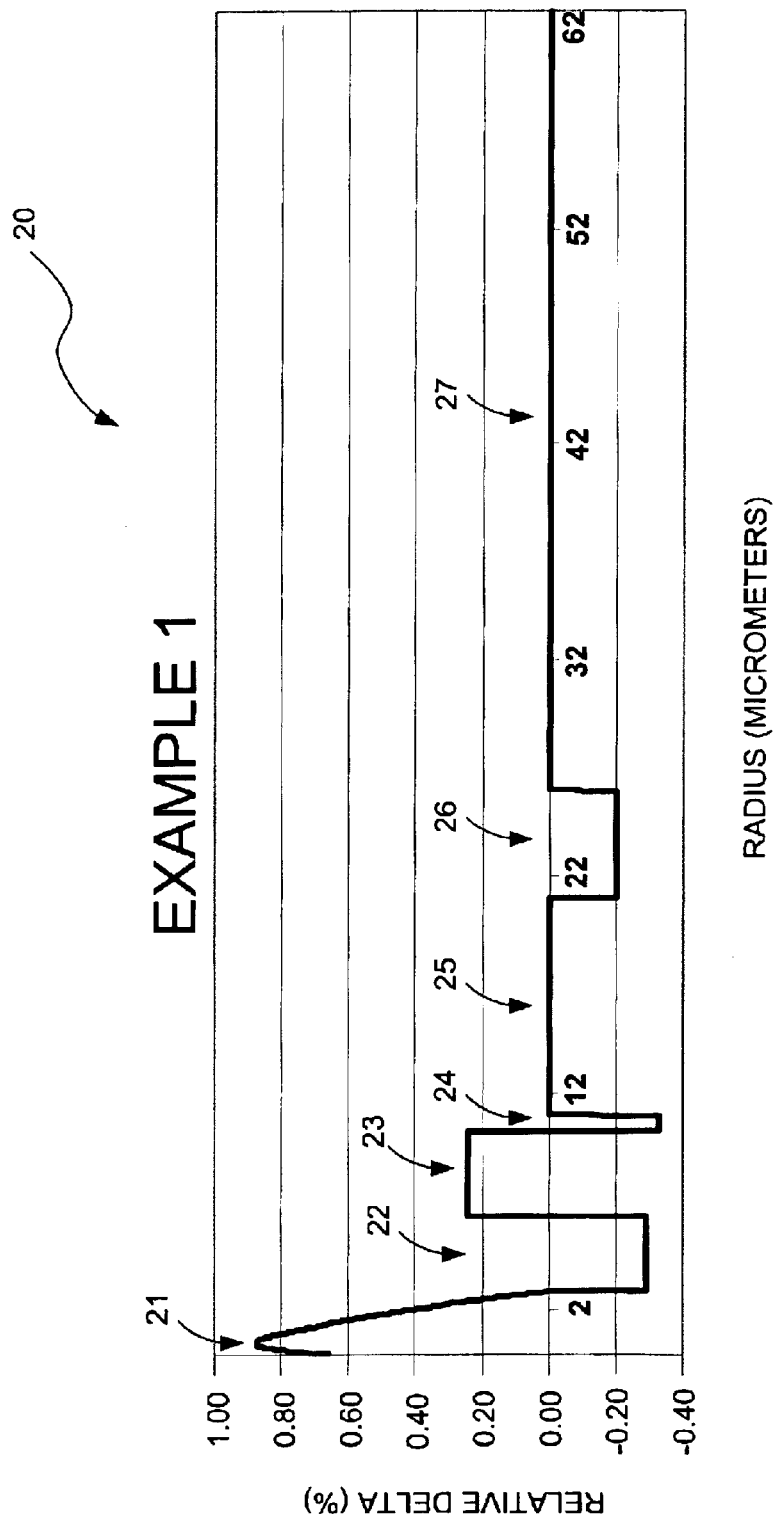
FIG. 2 is a plot of a refractive index profile of the large-effective-area inverse dispersion optical fiber of the present invention shown in FIG. 5.
Figure 5:
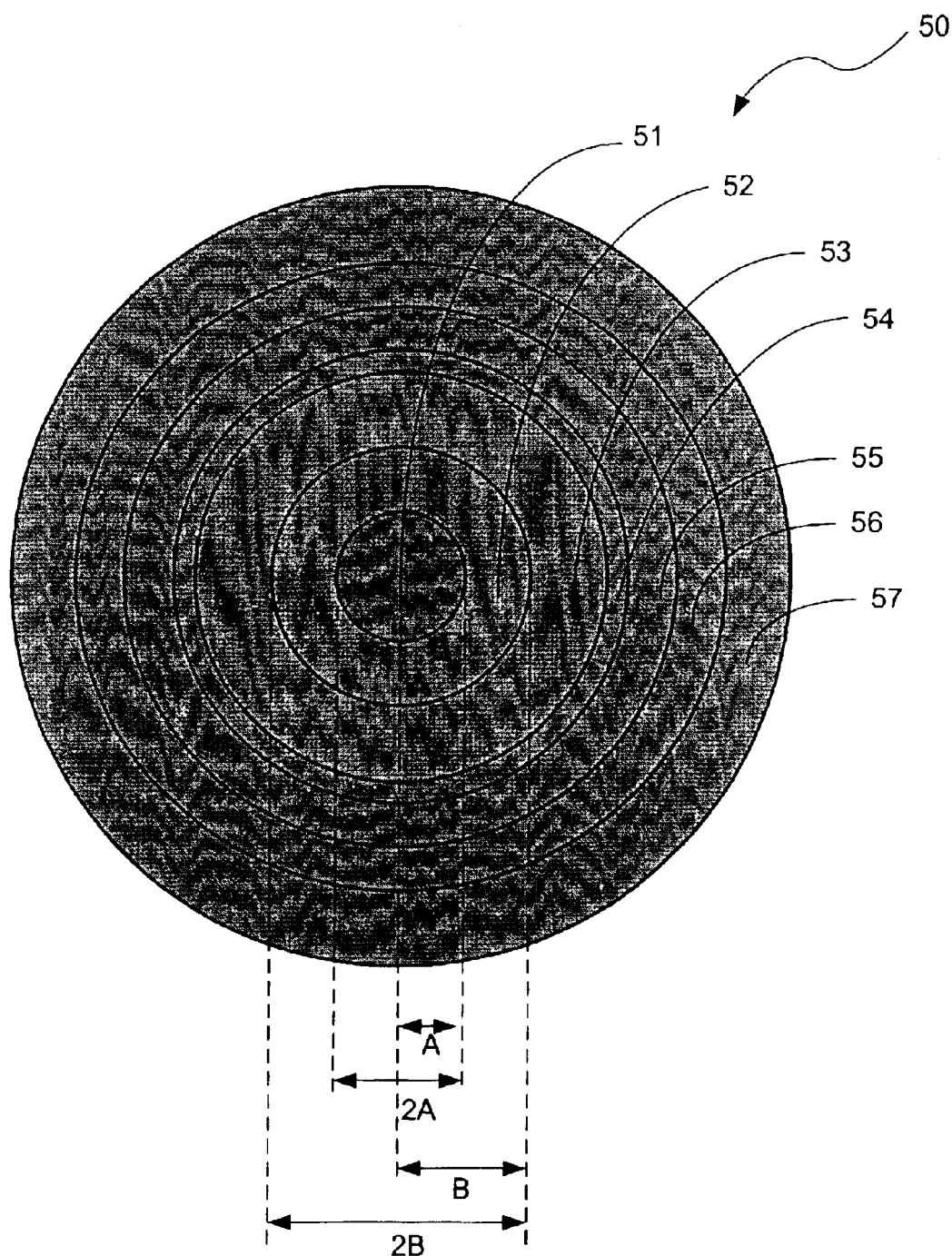
FIG. 5 is a cross-sectional end view of an inverse dispersion optical fiber having the refractive index profile shown in FIG. 2.

The profile 20 shown in the example embodiment of FIG. 2 corresponds to the fiber 50 shown in FIG. 5. The fiber 50 and its associated profile 20 will be discussed together. The fiber 50 has a core region 51 (FIG. 5) that has a profile portion 21 (FIG. 2) associated therewith that is generally parabolic (i.e., curved) in shape. The core region profile 21 has a maximum positive relative index of refraction $n_1$ of preferably approximately from approximately 0.85% to approximately 0.9% with preferred value of approximately 0.87%. The core region has a profile shape that is defined by a shape parameter known as alpha ($\alpha$), which preferably is approximately 1.6. The core region is surrounded by a first annular region (i.e., a first trench region) 52 (FIG. 5) that has a negative relative index of refraction $n_2$, which preferably is between approximately −0.20% and −0.40%, and preferably approximately −0.29%.

The portion of the profile that corresponds to the first trench region 52 is represented by reference numeral 22. The radius of the core region 51 is designated "A" and the diameter of the core region is designated 2A. The radius of the trench region 52 is designated B and the diameter of the trench region 52 is designated 2B. The ratio, $R_a$, of the diameter of the core region 51 to the diameter of the trench region 52 is less than or equal to approximately 0.45. Thus, in accordance with the present invention, it is possible to increase the effective area of the IDF without having a large ratio $R_a$.

The trench region 52 is surrounded by a second annular region 53 (i.e., a first barrier region) (FIG. 5) that has a positive relative index of refraction $n_3$ that preferably is between approximately 0.20% and approximately 0.40%, and preferably is approximately 0.24%. The portion of the profile that corresponds to the second annular region is represented by reference numeral 23. The second annular region 53 is surrounded by a third annular region 54 (i.e., a second trench region) (FIG. 5) that has a negative relative index of refraction $n_4$, which preferably is between approximately −0.20% and −0.40%, and preferably is approximately −0.33%. The portion of the profile that corresponds to the third annular region 54 is represented by reference numeral 24.

The third annular region 54 is surrounded by a fourth annular region 55 (FIG. 5) that is represented by the portion of the profile labeled by reference numeral 25. This region 55 has a relative index of refraction $n_5$ of 0.0%, which is the same as that of the cladding region 57 (FIG. 5). The fourth annular region 55 is surrounded by a fifth annular region 56 (i.e., a third trench region) (FIG. 5) that is represented by the portion of the profile labeled by reference numeral 26. This region has a relative index of refraction $n_6$ of preferably approximately −0.20%. The fifth annular region is surrounded by a sixth annular region, which corresponds to the cladding region. Profile portion 27 corresponds to the cladding region, which has a relative index of refraction $n_0$ of 0.0%.

The numbers on the horizontal axis correspond to the distance from the center of the core region in micrometers. The example ranges of the approximate radial locations and widths of each of the regions can be easily ascertained from the profile plot shown in FIG. 2. The numbers on the vertical axis correspond to relative index of refraction values. It should be noted that the present invention is not limited to these particular radial locations and/or approximations. Below are the transmission properties for the example IDF 50 represented by the profile 20 shown in FIG. 2 shown in FIG. 2. Although not shown in FIG. 2, the radius to the outer edge of the cladding 57 may extend to, for example, 62.5 microns.

It can be seen below that the transmission properties set forth below for example shown in FIG. 2 are very good. The IDF 50 has a very large effective area, which is 38.38 $\mu m^2$ in this example. It can also be seen that the RDS of the IDF 50 matches that of an SLA fiber, such as the aforementioned SLA UltraWave™ fiber. In addition, the IDF 50 has a relatively low bending loss and a relatively low cable cutoff wavelength.

Transmission Properties for IDF 50

Aeff: 38.38 $\mu m^2$

Dispersion: −34.66 ps/nm-km

Slope: −0.103 ps/nm$^2$/km

RDS: 0.003 nm$^{-1}$ 32 millimeter (mm) bending loss: <0.5 dB/loop cable cutoff wavelength: <1530 nm Of course, because these transmission properties tend to be related to each other, related to the shape of the refractive index profile, and related to the locations of the various regions, one or more of these transmission properties can be changed by altering the refractive index profile, as indicated below in Table 1.

TABLE 1

|  | $A_{eff}$ (1550 nm) | D (ps/km · nm) | S (ps/km · nm$^2$) | RDS(nm$^{-1}$) | 32 mm |
|---|---|---|---|---|---|
| example-1 | 38.38 | −34.66 | −0.103 | 0.003 | 1 |
| $n_2$ = −0.31% | 37.7 | −36.07 | −0.127 | 0.0035 | 1.2 |
| $n_2$ = −0.26% | 39.48 | −32.57 | −0.07 | 0.0022 | 0.8 |
| $n_1$ = 1.05% | 31.53 | −22.28 | −0.088 | 0.004 | 0.1 |
| $n_1$ = 0.955% | 41.51 | −38.43 | −0.088 | 0.0023 | 1.8 |
| alpha = 1.7 | 35.49 | −29.21 | −0.104 | 0.0035 | 0.4 |

TABLE 1-continued

|  | $A_{eff}$ (1550 nm) | D (ps/km·nm) | S (ps/km·nm²) | RDS(nm⁻¹) | 32 mm |
|---|---|---|---|---|---|
| alpha = 1.5 | 42.94 | −40.79 | −0.079 | 0.0019 | 2.4 |
| $n_3$ = 0.264% | 41.64 | −40.29 | −0.085 | 0.0021 | 1.2 |
| $n_3$ = 0.244% | 36.15 | −29.5 | −0.102 | 0.0035 | 0.8 |
| $r_4$ = 1.0 | 37.34 | −31.06 | −0.087 | 0.0028 | 0.7 |
| $r_4$ = 0.5 | 39.43 | −37.88 | −0.114 | 0.003 | 1.3 |
| $n_4$ = −0.2% | 40.17 | −39.73 | −0.116 | 0.0029 | 1.3 |
| OD = 126 um | 36.97 | −31.36 | −0.11 | 0.0035 | 0.6 |
| OD = 128 um | 35.08 | −25.62 | −0.108 | 0.0042 | 0.3 |
| OD = 123 um | 40.74 | −39.16 | −0.085 | 0.0022 | 1.8 |

The preferred profile parameters for example 1 are:

| $N_1$ | $r_1$ (um) | alpha | $n_2$ | $r_2$ (um) | $n_3$ | $r_3$ (um) | $n_4$ | $r_4$ (um) |
|---|---|---|---|---|---|---|---|---|
| 9.75E−03 | 2.89 | 1.6 | −2.90E−03 | 3.44 | 2.44E−03 | 3.94 | −3.30E−03 | 0.7 |

Figure 3:
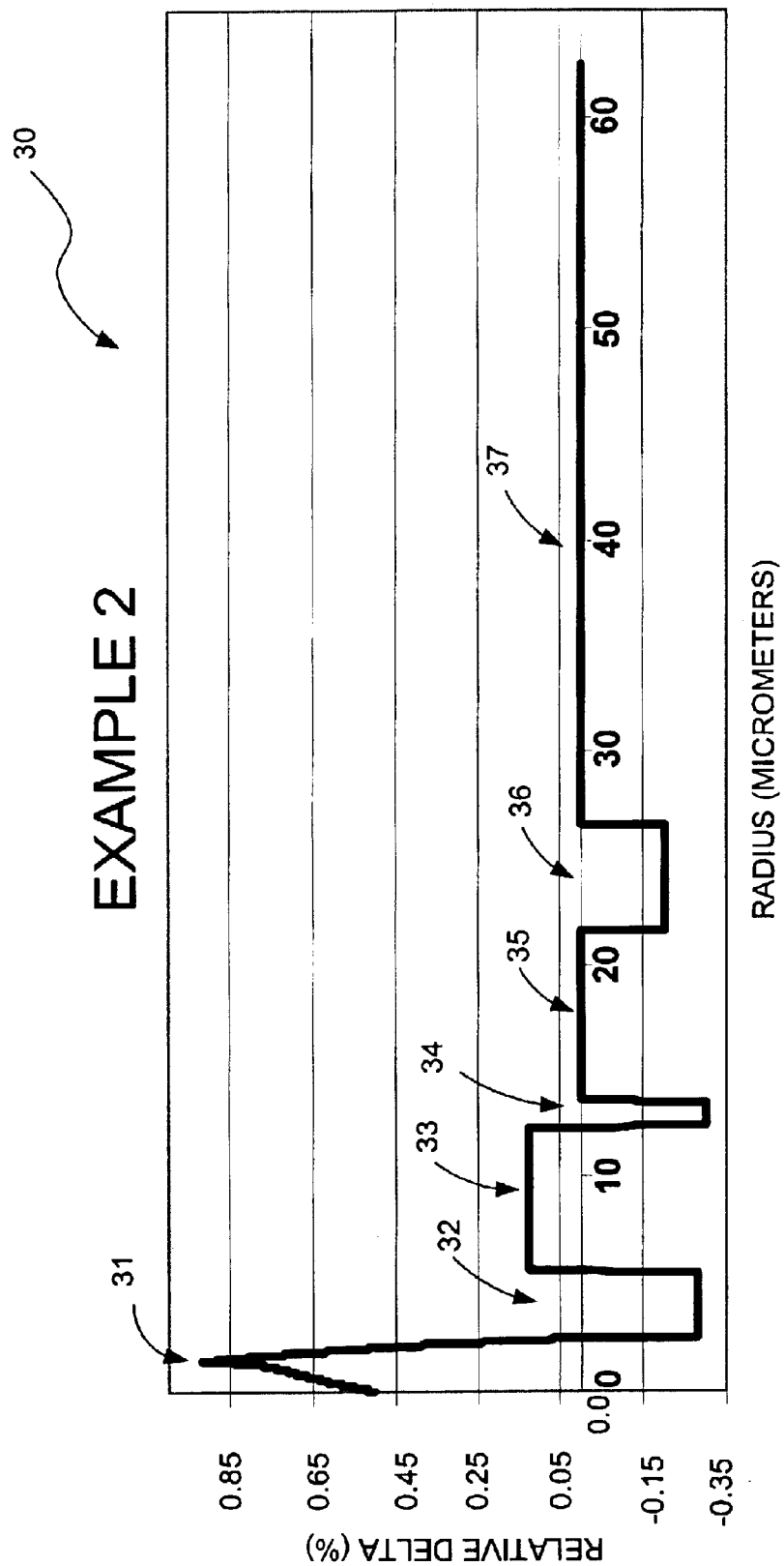
FIG. 3 is a plot of a refractive index profile of the large-effective-area inverse dispersion optical fiber of the present invention shown in FIG. 6.
Figure 4:
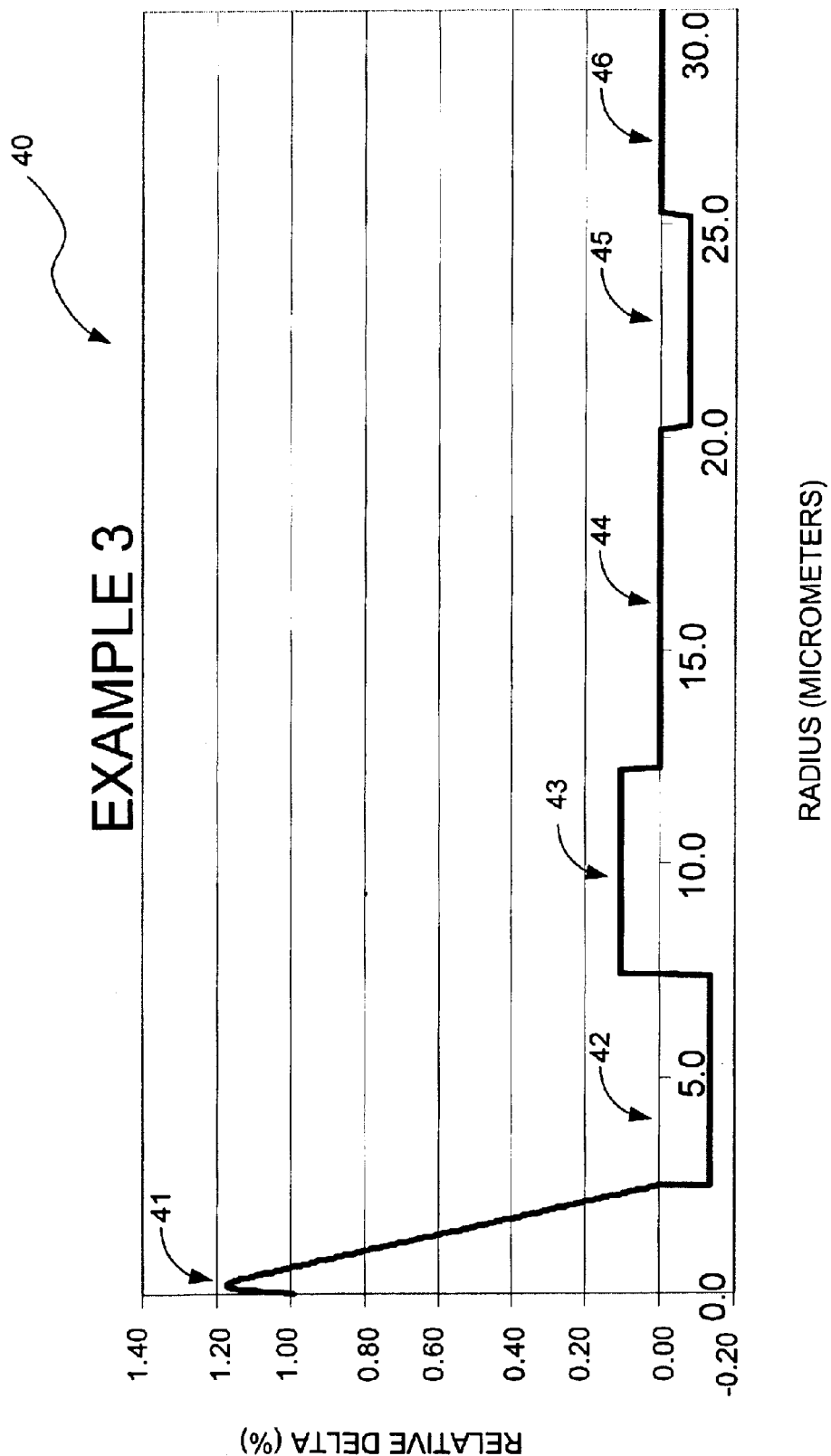
FIG. 4 is a plot of a refractive index profile of the large-effective-area inverse dispersion optical fiber of the present invention shown in FIG. 7.

The large-effective area IDF of the present invention is not limited to having these particular transmission properties, as will become apparent from the discussion of FIGS. 3 and 4, which illustrate refractive index profiles for large-effective-area inverse dispersion fibers, which have transmission properties that are different from those shown in Table 1, but which are also very desirable.

Figure 6:
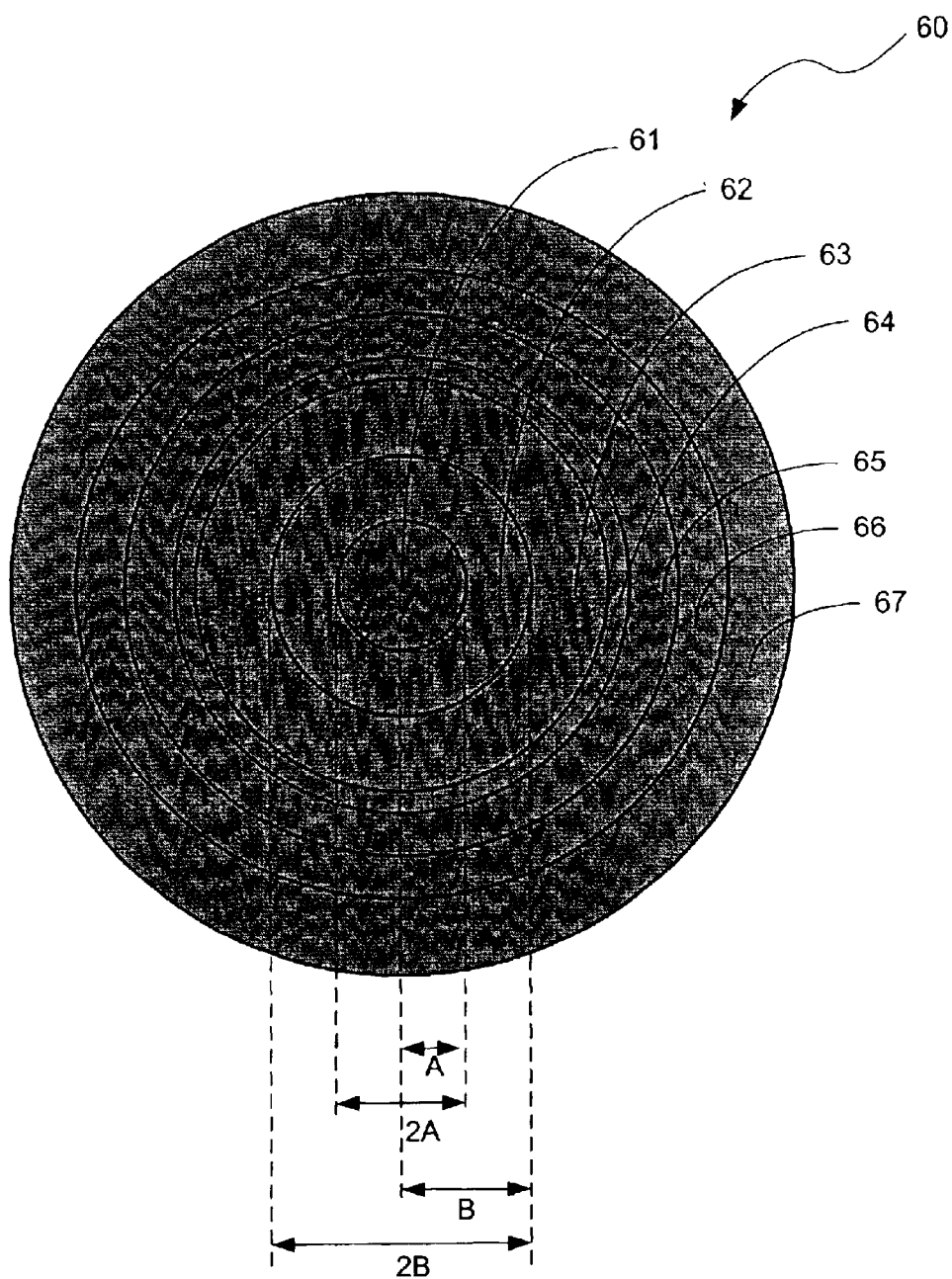
FIG. 6 is a cross-sectional end view of an inverse dispersion optical fiber having the refractive index profile shown in FIG. 3.

The profile 30 shown in FIG. 3 has core region profile portion 31 that is non-parabolic (i.e., α=2.9) in shape. The profile 30 shown in FIG. 3 and the large-effective-area IDF 60 (FIG. 6) it is associated with will be described together. The core region 61 has a profile portion 31 associated with it that has a maximum positive relative index of refraction $n_1$ that preferably is approximately $0.85\% \leq n_1 \leq 1.055\%$, with a preferred value of 0.91%. The core region 61 has a profile shape that is defined by the shape parameter α, which preferably is approximately 2.9. The core region 61 is surrounded by a first annular region (i.e., a first trench region) 62 that has a negative relative index of refraction $n_2$, which preferably ranges from approximately $-0.15\% \leq n_2 \leq -0.35\%$, and preferably approximately −0.28%. The portion of the profile that corresponds to the first trench region 62 is represented by reference numeral 32. The radius of the core region 61 is designated "A" and the diameter of the core region is designated 2A. The radius of the trench region 62 is designated B and the diameter of the trench region 62 is designated 2B. The ratio, $R_a$, of the diameter of the core region 61 to the diameter of the trench region 62 preferably is less than or equal to approximately 0.45.

The trench region 62 is surrounded by a second annular region (i.e., the first barrier region) 63 that has a positive relative index of refraction $n_3$ that preferably ranges from approximately $0.05\% \leq n_3 \leq 0.25\%$, and preferably is approximately 0.12%. The portion of the profile that corresponds to the second annular region 63 is represented by reference numeral 33. The second annular region 63 is surrounded by a third annular region (i.e., a second trench region) 64 that has a negative relative index of refraction $n_4$, which preferably ranges from approximately $-0.15\% \leq n_4 \leq -0.35\%$, and preferably is approximately −0.30%. The portion of the profile that corresponds to the third annular region 64 is represented by reference numeral 34.

The third annular region 64 is surrounded by a fourth annular region 65 that is represented by the portion of the profile labeled by reference numeral 35. This region 65 has a relative index of refraction $n_5$ of 0.0%, which is the same as that of the cladding region. The fourth annular region 65 is surrounded by a fifth annular region (i.e., a third trench region) 66 that is represented by the portion of the profile labeled by reference numeral 36. This region 66 has a negative relative index of refraction $n_6$ of preferably less than or equal to approximately −0.20%. The fifth annular region 66 is surrounded by a sixth annular region 67, which corresponds to the cladding region. Profile portion 37 corresponds to the cladding region 67, which has a relative index of refraction no of 0.0%.

As is the case with FIG. 2, the numbers on the horizontal axis in FIG. 3 correspond to the distance outward from the center of the core region in micrometers. The numbers on the vertical axis correspond to relative index of refraction values. The ranges of the approximate radial locations and widths of each of the regions in this example can be easily ascertained from the plot shown in FIG. 3. The present invention is not limited to these particular radial locations and/or approximations. Below are the transmission parameters for the IDF 60 represented by the profile 30 shown in FIG. 3 for a transmission wavelength of approximately 1550 nm. Although not shown in FIG. 3, the radius to the outer edge of the cladding may extend to, for example, 62.5 microns (i.e., a diameter of approximately 125 microns).

It can be seen from that the transmission properties corresponding to the IDF 60 are very good and that the IDF 60 has a very large effective area, which is 40.6 $\mu m^2$ in this example. The RDS also matches that of SLA fibers that are used as transmission fibers. In addition, the IDF 50 has a relatively low bending loss and a relatively low cable cutoff wavelength.

Transmission Properties for IDF 60

Aeff: 40.6 $\mu m^2$

Dispersion: −39.34 ps/nm-km

Slope: −0.109 ps/nm²/km

RDS: 0.0028 nm⁻¹

32 millimeter (mm) bending loss: <0.5 dB/loop cable cutoff wavelength: <1530 nm

Because these transmission properties tend to be related to each other, related to the shape of the refractive index profile and related to the locations of the various regions, one or more of these transmission properties can be changed by altering the refractive index profile, as below indicated in Table 2.

TABLE 2

|  | $A_{eff}$ (1550 nm) | D (ps/km · nm) | S (ps/km · nm$^2$) | RDS (nm$^{-1}$) | 32 mm |
|---|---|---|---|---|---|
| example 2 | 40.6 | −39.34 | −0.109 | 0.0028 | 1 |
| $n_2 = -0.3\%$ | 40.46 | −42.72 | −0.135 | 0.0032 | 1.3 |
| $N_2 = -0.26\%$ | 40.8 | −36.23 | −0.086 | 0.0024 | 0.7 |
| $N_3 = 0.137\%$ | 42.79 | −43.37 | −0.1 | 0.0023 | 1.2 |
| $N_3 = 0.117\%$ | 38.86 | −35.55 | −0.11 | 0.0031 | 0.9 |
| $n_1 = 1.2\%$ | 34.41 | −29.42 | −0.112 | 0.0038 | 0.2 |
| $N_1 = 1.13\%$ | 44.48 | −43.46 | −0.084 | 0.0019 | 1.9 |
| $n_4 = -0.2\%$ | 41.39 | −42.23 | −0.126 | 0.003 | 1.3 |
| OD = 126 um | 38.15 | −33.62 | −0.12 | 0.0036 | 0.5 |
| OD = 128 um | 36.33 | −28.16 | −0.12 | 0.0042 | 0.3 |
| OD = 123 um | 42.76 | −43.03 | −0.086 | 0.002 | 1.6 |

The preferred profile values for this example are:

| $N_1$ | $r_1$ (um) | alpha | $n_2$ | $r_2$ (um) | $n_3$ | $r_3$ (um) | $n_4$ | $r_4$ (um) |
|---|---|---|---|---|---|---|---|---|
| 0.0115 | 2.52 | 2.91 | −0.003 | 3.1 | 0.0013 | 6.75 | −0.0033 | 0.9 |

Figure 7:
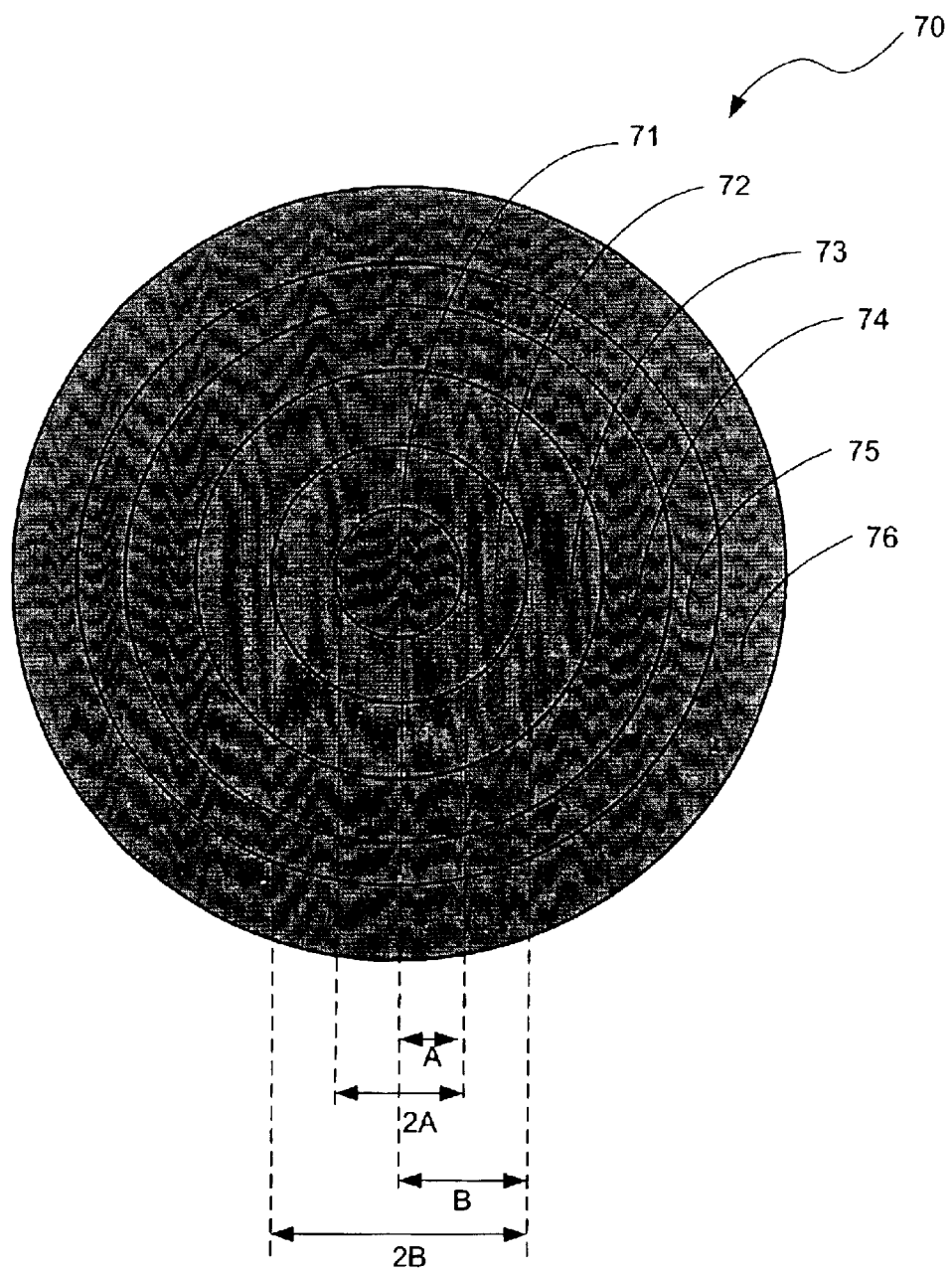
FIG. 7 is a cross-sectional end view of an inverse dispersion optical fiber having the refractive index profile shown in FIG. 4.

FIG. 4 is a plot of a refractive index profile of yet another example embodiment of the large-effective-area IDF of the present invention. The profile 40 shown in FIG. 4 will be described with reference to the associated large-effective-area IDF 70 shown in FIG. 7. The profile 40 shown in the example embodiment of FIG. 4 has a core region 71 that has an associated profile portion 41 that is almost triangular in shape, but which is slightly curved at the maximum relative refractive index of the core region 71, $n_1$, which is approximately 1.17% in this example. The shape of the core region 71 is defined by shape parameter α, which preferably is approximately 1.0. The core region 71 is surrounded by a first annular region (i.e., a first trench region) 72 that has a negative relative index of refraction $n_2$, which preferably ranges from approximately $0.0\% \leq n_2 \leq -0.20\%$, and preferably is approximately −0.133%. The portion of the profile that corresponds to the first trench region 72 is represented by reference numeral 42. The radius of the core region 71 is designated "A" and the diameter of the core region is designated 2A. The radius of the trench region 72 is designated B and the diameter of the trench region 72 is designated 2B. The ratio, $R_a$, of the diameter of the core region 71 to the diameter of the trench region 72 is less than or equal to approximately 0.36.

The trench region 72 is surrounded by a second annular region (i.e., a first barrier region) 73 that has a positive relative index of refraction $n_3$ that preferably ranges from approximately $0.0\% \leq n_3 \leq -0.20\%$, and preferably is approximately 0.107% in this example. The portion of the profile that corresponds to the second annular region 73 is represented by reference numeral 43. The second annular region 73 is surrounded by a third annular region 74 that has a relative index of refraction $n_4$, which preferably is equal to that of the cladding region 76 (i.e., 0.0%). The portion of the profile that corresponds to the third annular region 74 is represented by reference numeral 44.

The third annular region 74 is surrounded by a fourth annular region (i.e., a second trench region) 75 that is represented by the portion of the profile labeled by reference numeral 45. This region 75 has a negative relative index of refraction $n_5$ that preferably ranges from approximately $0.0\% \leq n_5 \leq -0.20\%$, and preferably is approximately −0.08% in this example. The fourth annular region 75 is surrounded by the cladding region 76, which is represented by the portion of the profile labeled by reference numeral 46. The portion of the profile corresponding to the cladding region 76 has a relative index of refraction $n_0$ of 0.0%.

As with the plots shown in FIGS. 2 and 3, the numbers on the horizontal axis correspond to the distance from the center of the core region in micrometers. The example ranges of the approximate radial locations and widths of each of the regions can be easily ascertained from the profile plot shown in FIG. 4. It should be noted that the present invention is not limited to these particular radial locations and/or approximations. The numbers on the vertical axis correspond to relative index of refraction values. Table 3 below illustrates the transmission properties for the IDF represented by the profile 40 shown in FIG. 4 for a transmission wavelength of 1550 nm. Although not shown in FIG. 2, the radius to the outer edge of the cladding may extend to, for example, 62.5 microns.

Below are the transmission properties for IDF 70. The transmission properties for the IDF 70 are very good and the IDF has a very large effective area, which is 39.50 $\mu m^2$ in this example. As with the other example embodiments, the RDS matches that of SLA fiber often used as transmission fiber. In addition, the IDF 70 has a relatively low bending loss and a relatively low cable cutoff wavelength. The attenuation at 1550 nm is less than 0.25 dB/km in this example.

TABLE 3

| | |
|---|---|
| Aeff: | 39.50 $\mu m^2$ |
| Dispersion: | −40.06 ps/nm-km |
| Slope: | −0.131 ps/nm$^2$/km |
| RDS: | 0.003 nm$^{-1}$ |
| 32 millimeter (mm) bending loss: | 0.5 dB/loop |
| cable cutoff wavelength: | 1450 nm |

As stated above, because these transmission properties tend to be related to each other, related to the shape of the refractive index profile and related to the locations of the various regions, one or more of these transmission properties can be changed by altering the refractive index profile, as indicated below in Table 3. Of course, the large-effective area IDF of the present invention is not limited to having these particular transmission properties.

TABLE 3

|  | $A_{eff}$ (1550 nm) | D (ps/km · nm) | S (ps/km · nm²) | RDS(nm⁻¹) | 32 mm |
|---|---|---|---|---|---|
| example-3 | 39.46 | −39.99 | −0.13 | 0.00325 | 1 |
| $n_2 = -0.10\%$ | 40.56 | −36.45 | −0.08 | 0.0022 | 0.7 |
| $n_2 = -0.26\%$ | 38.5 | −44.01 | −0.07 | 0.0044 | 1.5 |
| Alpha = 1.1 | 34.03 | −30.55 | −0.083 | 0.0027 | 0.2 |
| $n_1 = 0.0128$ | 44.33 | −46.1 | −0.137 | 0.003 | 2.5 |
| $n_1 = 0.0136$ | 36.05 | −34.92 | −0.107 | 0.0031 | 0.4 |
| $n_3 = 0.129\%$ | 42.41 | −48.36 | −0.16 | 0.0033 | 1.4 |
| $n_3 = 0.089\%$ | 37.58 | −33.65 | −0.094 | 0.0028 | 0.7 |
| OD = 126 um | 40.09 | −43.88 | −0.161 | 0.0037 | 6.3 |
| OD = 123 um | 46.25 | −53.93 | −0.128 | 0.0024 | 34.3 |

The preferred profile values for example 3 are:

| $N_1$ | $r_1$ (um) | alpha | $n_2$ | $r_2$ (um) | $N_3$ | $r_3$ (um) |
|---|---|---|---|---|---|---|
| 1.32E−02 | 2.456 | 1 | −1.20E−03 | 5.235 | 1.09E−03 | 4.837 |

Each of the fibers represented by the profiles shown in FIGS. 2, 3 and 4 preferably comprises a germanium-doped silica ($SiO_2$) core (e.g., $SiO_2$ doped with an appropriate amount of $GeO_2$), a fluorine (F) and/or germanium (Ge)-doped trench region surrounding the core region (e.g., $SiO_2$ doped with an appropriate amount of $GeO_2$ and F), and a pure silica outer cladding surrounding the trench region. The annular regions in the fiber that have positive relative indices of refraction preferably comprise $SiO_2$ doped with an appropriate amount of $GeO_2$.

It will be apparent to those skilled in the art that many changes and substitutions can be made to the embodiments of the optical fibers described herein without departing from the scope of the invention as defined by the appended claims and their full scope of equivalents. Such changes and substitutions include, but are not limited to, the use of different doping materials to achieve various profile shapes, and the use of plastic materials (rather than glass) in making the optical fiber.

What is claimed is:

1. An optical fiber communications system, comprising:
    at least one source of optical energy;
    an optical fiber cable including at least one positive dispersion optical fiber coupled to said at least one source, and at least one inverse dispersion optical fiber coupled to the positive dispersion optical fiber,
    wherein the inverse dispersion optical fiber includes:
        a core region having an index of refraction $n_1$, a radius A and a diameter 2×A, where A is a positive number,
        a cladding region having an index of refraction $n_0$,
        a first trench region between the core region and the cladding region and adjacent the core region, the first trench region having a negative relative index of refraction $n_2$, the first trench region having a radius B and a diameter 2×B, where B is a positive number, and wherein a ratio (2×A)/(2×B) is less than or equal to approximately 0.45,
        a first barrier region between the core region and the cladding region and adjacent the trench region, the first barrier region having a positive relative index of refraction $n_3$,
        a second trench region between the core region and the cladding region and adjacent the first barrier region, the second trench region having a negative relative index of refraction $n_4$,
    wherein the inverse dispersion optical fiber has an effective area, Aeff, that is greater than 31 micrometers squared ($\mu m^2$) at a transmission wavelength of approximately 1550 nanometers (nm), and
    wherein the inverse dispersion optical fiber has relative dispersion slope (RDS) that ranges from approximately 0.0022 nm⁻¹ ≤ RDS ≤ 0.0067 nm⁻¹ at a transmission wavelength of approximately 1550 nm; and
    at least one receiver coupled to the inverse dispersion optical fiber for receiving optical energy from the source.

2. The system of claim 1, wherein the inverse dispersion optical fiber has a relative dispersion slope (RDS) that is approximately 0.003 nm⁻¹ at a transmission wavelength of approximately 1550 nm.

3. The system of claim 1, wherein the effective area, Aeff, of the inverse dispersion fiber is greater than or equal to approximately 31.53 $\mu m^2$ at a transmission wavelength of approximately 1550 nm.

4. The system of claim 3, wherein the inverse dispersion fiber has a dispersion slope ranging from approximately −0.07 to approximately −0.25 picoseconds per squared nanometer per kilometer (ps/nm²/km) at a transmission wavelength of approximately 1550 nm.

5. The system of claim 4, wherein the inverse dispersion fiber has a dispersion slope of approximately −0.103 picoseconds per squared nanometer per kilometer (ps/nm²/km) at a transmission wavelength of approximately 1550 nm.

6. The system of claim 3, wherein the inverse dispersion fiber has a 32-millimeter bending loss less than approximately 0.5 dB/loop.

7. The system of claim 3, wherein the inverse dispersion fiber has a maximum relative refractive index that ranges from approximately 0.85% to approximately 0.9%.

8. The system of claim 1, wherein the inverse dispersion optical fiber has a relative dispersion slope (RDS) that ranges from approximately 0.002 to approximately 0.0065 per nanometer (nm⁻¹) at a transmission wavelength of approximately 1550 nm.

9. The system of claim 1, wherein the effective area, Aeff, of the inverse dispersion fiber is greater than or equal to approximately 39.50 $\mu m^2$ at a transmission wavelength of approximately 1550 nm.

10. The system of claim 9, wherein the inverse dispersion fiber has a dispersion of approximately −40.06 picoseconds per nanometer-kilometer (ps/nm-km) at a transmission wavelength of approximately 1550 nm.

11. The system of claim 9, wherein the inverse dispersion fiber has a dispersion slope of approximately −0.131 picoseconds per squared nanometer per kilometer (ps/nm²/km) at a transmission wavelength of approximately 1550 nm.

12. An optical fiber communications system, comprising:
   at least one source of optical energy;
   an optical fiber cable including at least one positive dispersion optical fiber coupled to said at least one source, and at least one inverse dispersion optical fiber coupled to the positive dispersion optical fiber,
   wherein the inverse dispersion optical fiber includes:
   a core region having an index of refraction $n_1$ a radius A and a diameter 2×A, where A is a positive number,
   a cladding region having an index of refraction $n_0$,
   a first trench region between the core region and the cladding region and adjacent the core region, the first trench region having a negative relative index of refraction $n_2$, the first trench region having a radius B and a diameter 2×B, where B is a positive number, and wherein a ratio (2×A)/(2×B) is less than or equal to approximately 045,
   a first barrier region between the core region and the cladding region and adjacent the trench region, the first barrier region having a positive relative index of refraction $n_3$,
   a second trench region between the core region and the cladding region and adjacent the first barrier region, the second trench region having a negative relative index of refraction $n_4$,
   wherein the inverse dispersion optical fiber has an effective area, Aeff, that is greater than 31 micrometers ($\mu m^2$) at a transmission wavelength of approximately 1550 nanometers (nm), and
   wherein the inverse dispersion optical fiber has a dispersion that ranges from approximately −20 to −50 picoseconds per nanometer-kilometer (ps/nm-km) at a transmission wavelength of approximately 1550 nm; and
   at least one receiver coupled to the inverse dispersion optical fiber for receiving optical energy from the source.

13. The system of claim 12, wherein the inverse dispersion fiber has a dispersion of −34 picoseconds per nanometer-kilometer (ps/nm-km) at a transmission wavelength of approximately 1550 nm.

14. An optical fiber commutations system, comprising:
   at least one source of optical energy;
   an optical fiber cable including at least one positive dispersion optical fiber coupled to said at least one source, and at least one inverse dispersion optical fiber coupled to the positive dispersion optical fiber,
   wherein the inverse dispersion optical fiber includes:
   a core region having an index of refraction $n_1$, a radius A and a diameter 2×A, where A is a positive number,
   a cladding region having an index of refraction $n_0$,
   a first trench region between the core region and the cladding region and adjacent the core region, the first trench region having a negative relative index of refraction $n_2$, the first trench region having a radius B and a diameter 2×B, where B is a positive number, and wherein a ratio (2×A)/(2×B) is less than or equal to approximately 045,
   a first barrier region between the core region and the cladding region and adjacent the trench region, the first barrier region having a positive relative index of refraction $n_3$,
   a second trench region between the core region and the cladding region and adjacent the first barrier region, the second trench region having a negative relative index of refraction $n_4$,
   wherein the inverse dispersion optical fiber has an effective area, Aeff, that is greater than 31 micrometers squared ($\mu m^2$) at a transmission wavelength of approximately 1550 nanometers (nm), and
   wherein the inverse dispersion optical fiber further includes a third trench region in the cladding region, the third trench region having a negative relative index of refraction; and
   at least one receiver coupled to the inverse dispersion optical fiber for receiving optical energy from the source.

15. The system of claim 1, wherein the inverse dispersion optical fiber has a relative dispersion slope (RDS) that ranges from approximately 0.0022 per nanometer ($nm^{-1}$) to approximately 0.0065 $nm^{-1}$ at a transmission wavelength of approximately 1550 nm.

16. The system of claim 1, wherein the effective area, Aeff, of the inverse dispersion fiber is greater than or equal to approximately 34.4 $\mu m^2$ at a transmission wavelength of approximately 1550 nm.

17. The system of claim 16, wherein the inverse dispersion fiber has a dispersion that ranges from approximately −20 to approximately −50 picoseconds per nanometer-kilometer (ps/nm-km) at a transmission wavelength of approximately 1550 nm.

18. The system of claim 16, wherein the inverse dispersion fiber has a dispersion slope that ranges from approximately −0.08 to approximately −0.2 picoseconds per squared nanometer per kilometer (ps/nm$^2$/km) at a transmission wavelength of approximately 1550 nm.

19. The system of claim 16, wherein the inverse dispersion fiber has a 32-millimeter bending loss less than approximately 0.5 dB/loop.

20. The system of claim 16, wherein the inverse dispersion fiber has a maximum relative refractive index that ranges from approximately 0.85% to approximately 1.05%.

21. An inverse dispersion optical fiber that has a large effective area, the fiber comprising:
   a core region having an index of refraction $n_1$, the core region having a radius A and a diameter 2×A, where A is a positive number;
   a cladding region having an index of refraction $n_0$;
   a first trench region between the core region and the cladding region and adjacent the core region, the first trench region having a negative relative index of refraction $n_2$, the first trench region having a radius B and a diameter 2×B, where B is a positive number, and wherein a ratio (2×A)/(2×B) is less than or equal to approximately 0.45;
   a first barrier region between the core region and the cladding region and adjacent the trench region, the first barrier region having a positive relative index of refraction $n_3$; and
   a second trench region between the core region and the cladding region and adjacent the first barrier region, the second trench region having a negative relative index of refraction $n_4$;
   wherein the inverse dispersion optical fiber has an effective area, Aeff, that is greater than or equal to approximately 34.4 micrometers squared ($\mu m^2$) at a transmission wavelength of approximately 1550 nanometers (nm), and
   wherein the fiber has a dispersion that ranges from approximately −20 to approximately −50 picoseconds per nanometer-kilometer (ps/nm-km) at a transmission wavelength of approximately 1550 nm.

22. The fiber of claim 21, wherein the fiber has a relative dispersion slope (RDS) that is approximately 0.003 nm$^{-1}$ at a transmission wavelength of 1550 nm.

23. The fiber of claim 21, wherein the effective area, Aeff, of the fiber is greater than or equal to approximately 31.53 $\mu$m$^2$ at a transmission wavelength of approximately 1550 nm.

24. The fiber of claim 23 wherein the fiber has a dispersion that ranges from approximately −20 to approximately −50 picoseconds per nanometer-kilometer (ps/nm-km) at a transmission wavelength of approximately 1550 nm.

25. The fiber of claim 23, wherein the fiber has a dispersion slope that ranges from approximately −0.08 to approximately −0.2 picoseconds per squared nanometer per kilometer (ps/nm$^2$/km) at a transmission wavelength of approximately 1550 nm.

26. The fiber of claim 23, wherein the fiber has a 32-millimeter bending loss less than approximately 0.5 dB/loop.

27. The fiber of claim 21, wherein the fiber has a relative dispersion slope (RDS) that ranges from approximately 0.0022 to approximately 0.0065 nm$^{-1}$ at a transmission wavelength of approximately 1550 nm.

28. The fiber of claim 21, further including a third trench region in the cladding region, the third trench region having a negative relative index of refraction.

29. The fiber of claim 21, wherein the fiber has a dispersion slope that ranges from approximately −0.08 to approximately −0.2 picoseconds per squared nanometer per kilometer (ps/nm$^2$/km) at a transmission wavelength of approximately 1550 nm.

30. The fiber of claim 21, wherein the fiber has a 32-millimeter bending loss less than approximately 0.5 dB/loop.

31. The fiber of claim 21, wherein the fiber has a relative dispersion slope (RDS) that ranges from approximately 0.002 to approximately 0.0065 per nanometer (nm$^{-1}$) at a transmission wavelength of approximately 1550 nm.

32. The fiber of claim 31, wherein the fiber has a dispersion of approximately −40.06 picoseconds per nanometer-kilometer (ps/nm-km) at a transmission wavelength of approximately 1550 nm.

33. The fiber of claim 21, wherein the effective area, Aeff, of the fiber is greater than or equal to approximately 39.50 $\mu$m$^2$ at a transmission wavelength of approximately 1550 nm.

34. The fiber of claim 33, wherein the fiber has a dispersion slope of approximately −0.131 picoseconds per squared nanometer per kilometer (ps/nm$^2$/km) at a transmission wavelength of approximately 1550 nm.

* * * * *